H. G. GINACA.
MACHINE FOR TREATING FRUIT.
APPLICATION FILED MAY 15, 1912.

1,112,130.

Patented Sept. 29, 1914.
5 SHEETS—SHEET 5.

Witnesses.

Inventor.
Henry G. Ginaca

UNITED STATES PATENT OFFICE.

HENRY GABRIEL GINACA, OF HONOLULU, TERRITORY OF HAWAII, ASSIGNOR TO HAWAIIAN PINEAPPLE COMPANY, LTD., OF HONOLULU, TERRITORY OF HAWAII, A CORPORATION OF THE TERRITORY OF HAWAII.

MACHINE FOR TREATING FRUIT.

1,112,130.

Specification of Letters Patent.   Patented Sept. 29, 1914.

Application filed May 15, 1912.  Serial No. 697,385.

*To all whom it may concern:*

Be it known that I, HENRY GABRIEL GINACA, a citizen of the United States, residing at Honolulu, county of Honolulu, Territory of Hawaii, have invented certain new and useful Improvements in Machines for Treating Fruit; and I do hereby declare the following to be a full, clear, and exact description of the invention, such as will enable others skilled in the art to which it appertains to make and use the same.

This invention relates to machines for treating fruit, such as pineapples.

Its object is to produce a machine which may be used for trimming off either one or both ends of fruit, preferably when sized, and also if desired for coring the fruit.

The invention contemplates a plurality of tubes, each adapted to receive a fruit, means for moving said tubes with a step by step movement to successive positions, means for treating the fruit in the tubes in one or more of these positions, and for finally discharging the fruit after treatment, all these ends being accomplished automatically in a rapid and efficient manner.

One form of the invention is illustrated in the accompanying drawings, forming a part of this specification, in which similar characters of reference indicate corresponding parts in each view.

Figure 1:
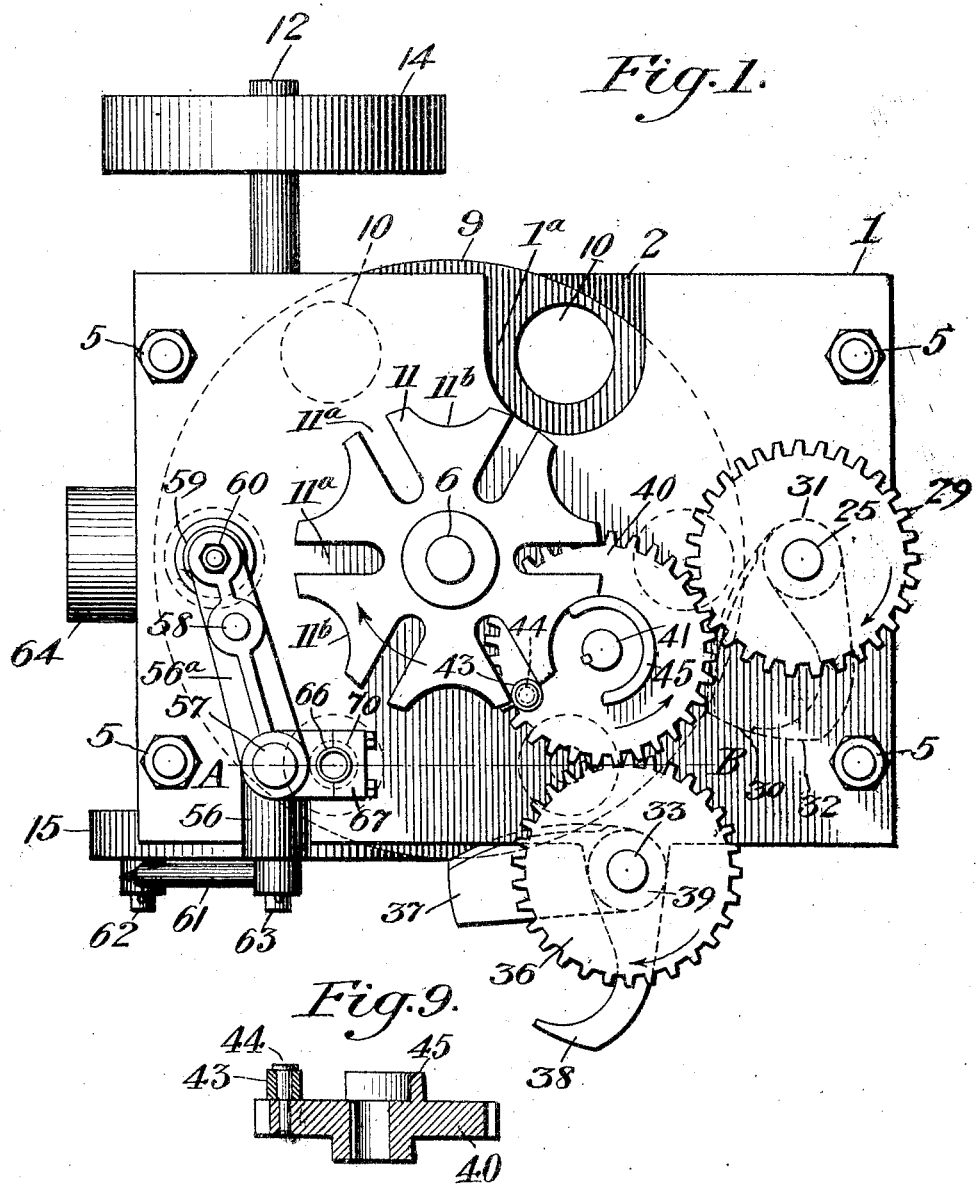
Figure 2:
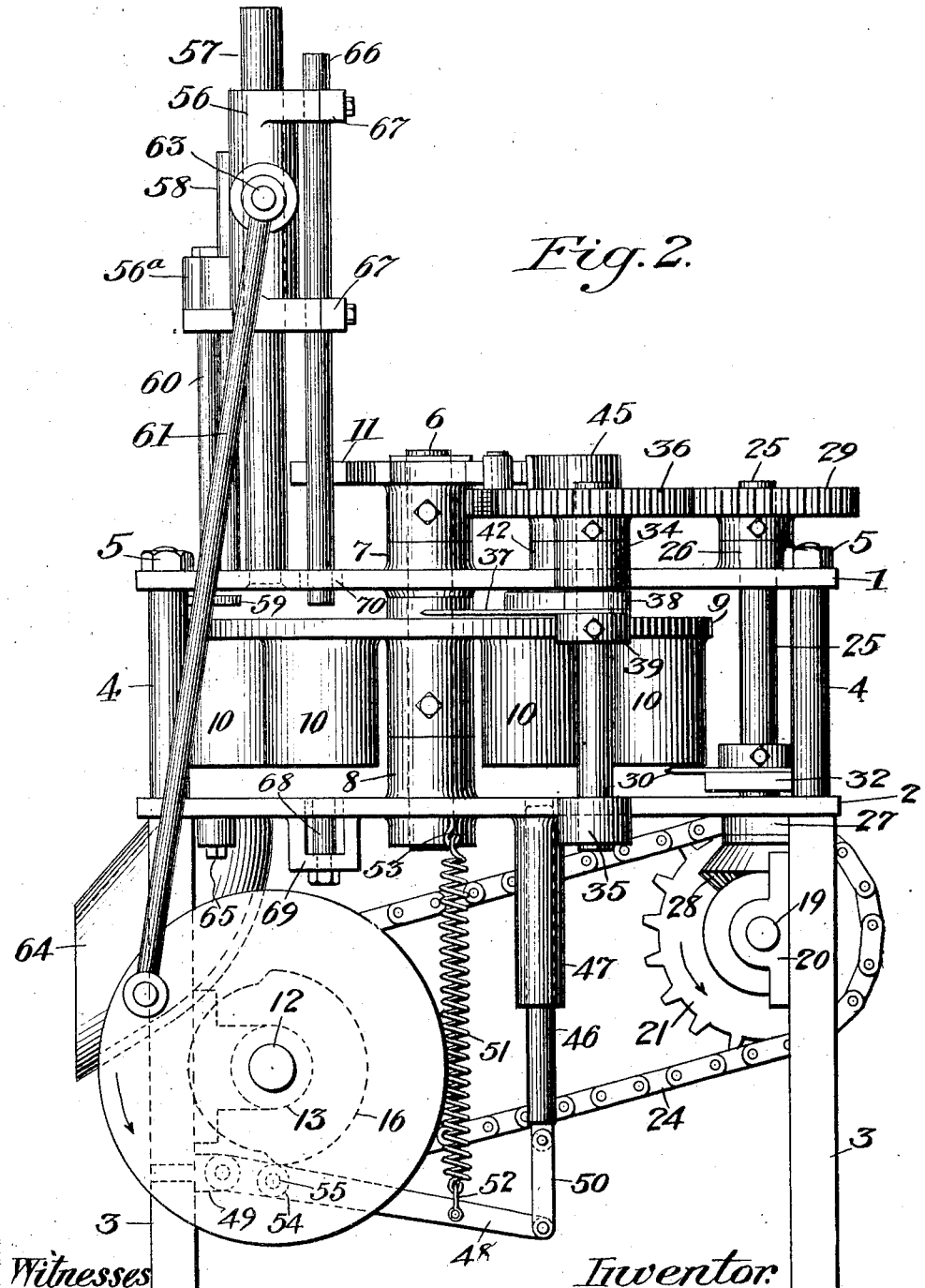
Figure 3:
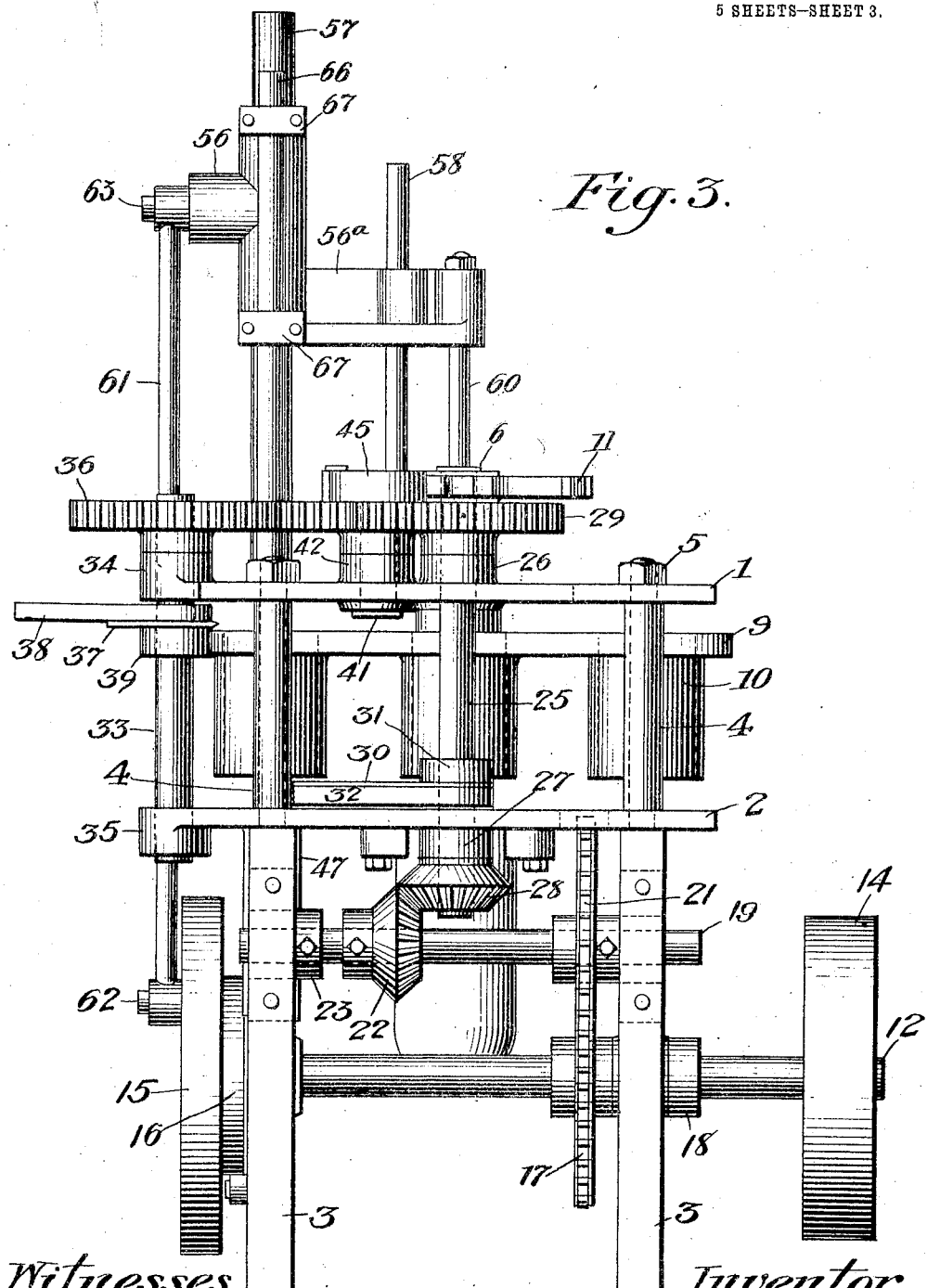
Figure 4:
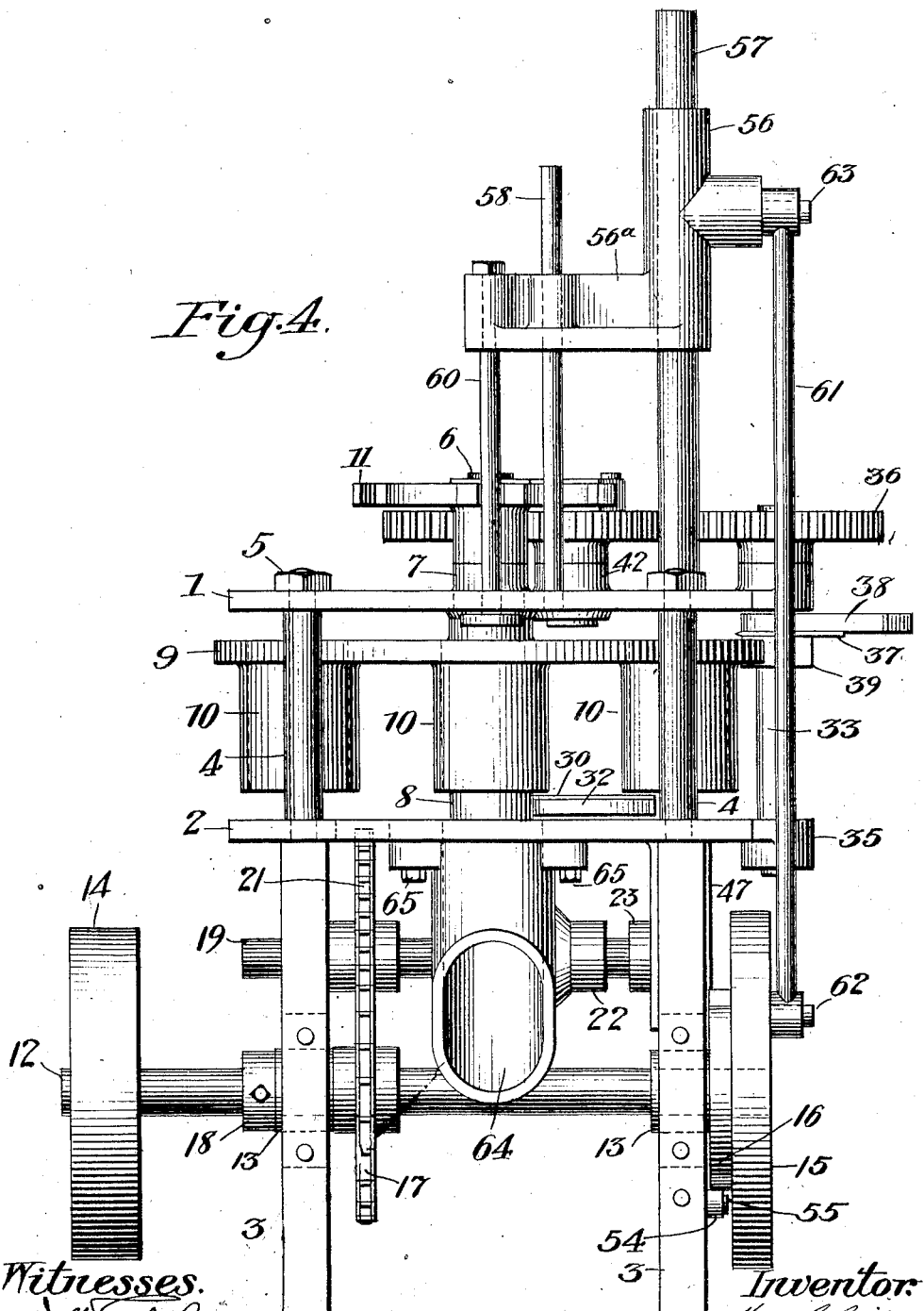
Figure 5:
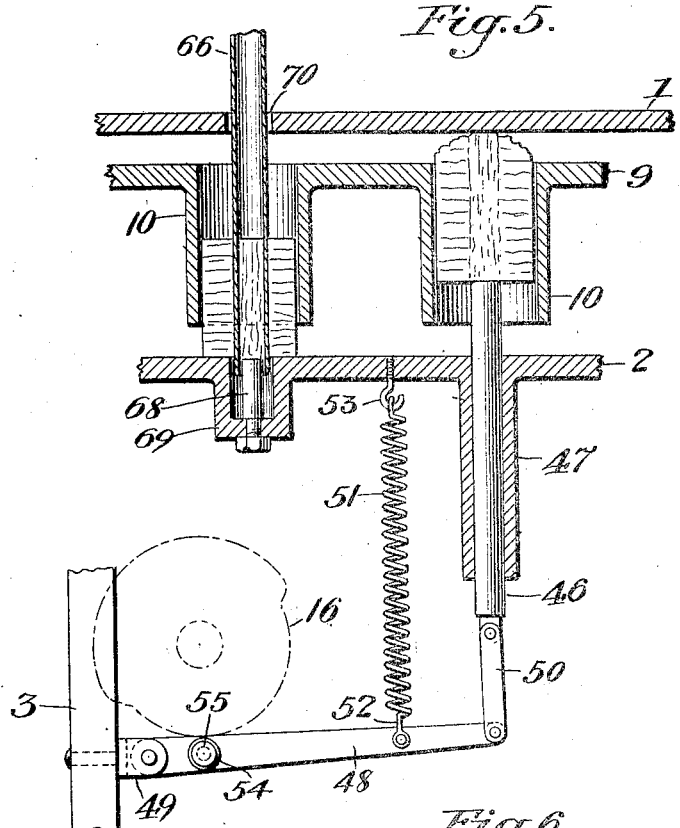
Figure 6:
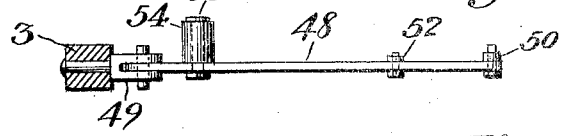
Figure 7:
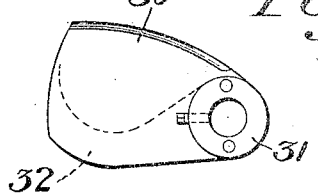
Figure 8:
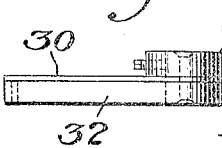

Figure 1 is a top plan view of a machine embodying my present invention. Fig. 2 is a side elevation of the same machine. Fig. 3 is a front elevation of the same. Fig. 4 is a rear elevation of the same. Fig. 5 is a section on the line A—B of Fig. 1. Fig. 6 is a bottom view of the lever shown in Fig. 5. Fig. 7 is a plan view of a knife and hook casting. Fig. 8 is a side view of Fig. 7. Fig. 9 is a section through the center of the gear 40.

Referring to the drawings, the frame of the machine consists of the upper and lower plates 1 and 2 respectively, preferably castings, supported by the posts or legs 3 with separators 4 between said plates. The legs 3 are shown made of square bars with their upper ends turned and threaded to receive the nuts 5. The lower plate 2 is shouldered against the upper end of the square portion of the legs 3. The separators 4 are pieces of pipe placed over the turned portion of the legs 3 between the plates 1 and 2, the whole being firmly clamped together by the nuts 5.

The vertical shaft 6 is journaled in the bosses 7 and 8 near the center of the plates 1 and 2 respectively. The casting 9, provided with a plurality of tubes 10, six being shown, is fastened to the shaft 6 between the bosses 7 and 8. The tubes 10 are each adapted to receive a fruit, preferably previously sized, fed through the opening or notch 1ª in the right hand edge of the plate 1. A star wheel 11 is secured to the shaft 6 above the boss 7. The star wheel 11 is provided with radial notches 11ª, also with circular arc shaped notches 11ᵇ in its periphery between the radial notches 11ª, six of each being shown in Fig. 1.

The driving shaft 12, journaled in the boxes 13 bolted to the two rear legs 3, is revolved by means of a belt applied to the pulley 14 keyed to one end of said shaft. A disk crank 15, a cam 16, a sprocket wheel 17 and a collar 18 are secured to this shaft 12. The shaft 19 is journaled horizontally in the boxes 20 bolted to the front legs 3, Figs. 2 and 3. To this shaft 19 are secured a sprocket wheel 21, a miter gear 22 and a collar 23. The sprocket wheels 17 and 21 have the same number of teeth and are connected together by the link belt chain 24, so that the shafts 12 and 19 revolve at the same speed. The vertical shaft 25 is journaled in the bosses 26 and 27 on the longitudinal center line of the plates 1 and 2 respectively and directly above the shaft 19. A miter gear 28 adapted to mesh with the miter gear 22 is secured to the lower end of the shaft 25 below the boss 27, and a spur gear 29 is fastened to the upper end of said shaft above the boss 26. A knife 30 is riveted between the collar 31 and the hook casting 32, Figs. 7 and 8. This collar 31 is secured to the shaft 25 above the plate 2, such that the knife 30 when the shaft 25 is revolved will just clear the lower end of one of the tubes 10 at each revolution.

The vertical shaft 33 is journaled in the bosses 34 and 35 on the left hand side of the plates 1 and 2 respectively as shown. A spur gear 36 is secured to the upper end of the shaft 33 above the boss 34. A knife 37 is riveted between the hub of the hook casting 38 and the collar 39. This collar 39 is fastened to the shaft 33 with the hook casting 38 just below the plate 1 and such that the knife 37 will just clear the top of one of the tubes 10 at each revolution of the shaft 33. The spur gear 40 is keyed to the pin 41 adapted to turn in the boss 42 so located on the plate 1 that this spur gear 40 meshes with both of the spur gears 29 and 36. The roller 43 is mounted to turn on the stud 44 in the spur gear 40, and is adapted to engage the star wheel 11 in one of the radial notches 11ª for the purpose of turning the star wheel 11 at each revolution of the spur gear 40, to produce in a well known manner a step by step motion of this star wheel and consequently of the tubes 10 as both are attached to the shaft 6. A segmental annular rib 45 is provided above the spur gear 40 to engage one of the circular arc shaped notches 11ᵇ in the periphery of the star wheel 11 as soon as the roller 43 has moved the star wheel and to hold same until said roller again engages the star wheel in a succeeding radial notch 11ª to move the star wheel and consequently the tubes 10 another step.

The plunger 46 is guided in the vertical sleeve 47 below the plate 2 and near the boss 35, Figs. 2 and 5. A lever 48 of the third class is fulcrumed in the fork 49 secured to the rear leg 3 at the left hand of the machine. The forward end of the lever 48 is connected by the links 50 to the lower end of the plunger 46. The lower end of the tension spring 51 is connected by the clevis 52 to the lever 48, and the upper end of said spring is attached to the hook 53 in the under side of the plate 2. The cam 16 engages the roller 54 on the stud 55 in the lever 48 and draws the plunger 46 downward, against the action of the spring 51, such that the upper end of the plunger 46 is below the surface of the plate 2 during half of a revolution of the cam 16.

The cross-head 56 is adapted to slide vertically on the guide-bar 57 secured to the upper plate 1 vertically over the shaft 12, and is prevented from turning on the guide-bar 57 by the smaller vertical guide-bar 58 also secured to the plate 1, and on which the arm 56ª of the cross-head 56 slides vertically. A plunger 59 is secured by the bolt 60 below the end of the arm 56ª of the cross-head 56. The connecting-rod 61 connects the crank-pin 62 in the disk crank 15 with the cross-head pin 63 in the cross-head 56. The discharge chute 64 is bolted by the bolts 65 under an opening in the center of the rear end of the lower plate 2, Figs. 2 and 4. When it is also desired to core the fruit, a coring tube 66 is adjustably secured in a vertical position to the cross-head 56 by the clamps 67, such that when in its upper position its lower or cutting end clears the casting 9 and tubes 10, and when in its lowest position the lower end surrounds or incloses the upper end of the abutment 68 bolted in the pocket 69 of the lower plate 2. The plate 1 acts as a stripper for the fruit from the coring tube, the hole 70 being made sufficiently large to just permit the coring tube 66 to pass through said plate.

In operation, with the revolving parts moving in the directions as indicated by arrows in Figs. 1 and 2, a fruit preferably sized is placed in the tube 10 which is then under the opening or notch 1ª of the upper plate 1. The spur gear 40 in turning anti-clockwise soon releases the rib 45 from contact with the notch 11ᵇ and causes the roller 43 to engage a radial notch 11ª over the longitudinal center line of the machine and thereby turn the star wheel 11 and with it the tubes 10 through 60°, whereupon the rib 45 again engages a notch 11ᵇ and prevents the star wheel 11 from turning until again released. The casting 9 with the tubes 10 were turned simultaneously with the star wheel 11, so that the fruit above mentioned as placed in a tube 10 is now on the center line and just in the rear of the shaft 25, the lower end of said fruit resting upon the plate 2. The shaft 25 in revolving causes the knife 30 to cut through the fruit just below the lower end of the tube 10 which guides the fruit, and causes the hook casting 32 to throw out the end of the fruit thus trimmed. The fruit is now advanced another step in the manner as described to the next position, at which time the cam 16 releases the lever 48 and permits the spring 51 to pull the lever 48 upward, thereby pushing the plunger 46 in the sleeve 47 until further upward movement is prevented by the upper end of the fruit in the tube 10 engaging the bottom of the upper plate 1, Fig. 5. It will be noted that a variation in the length of the fruit treated is thus provided for. The shaft 33 in revolving now causes the knife 37 to cut the fruit just above the top of the tube 10 and then the hook casting 32 to throw out the end of the fruit thus severed. The cam 16 now causes the lever 48 to lower and withdraw the plunger 46. The fruit, which now has had both of its ends trimmed off, is then moved another step to the position under the coring tube 66 with its axis over the center of the abutment 68. The disk crank 15 in revolving with the shaft 12 now pulls the connecting-rod 61 and causes the cross-head 56 to lower and in so doing forces the coring tube 66 through the longitudinal center of the fruit, and on the upward stroke the coring tube 66 with the core inside is withdrawn from the fruit, the plate 1 acting as a stripper. The fruit thus cored is now advanced the final step to the discharging position on the center line at the rear of the machine, whereupon the fruit, which has been treated as described, drops through an opening in the plate 2 and is discharged through the chute 64, the plunger 59 in lowering with the cross-head 56 prevents the fruit from remaining in the tube 10 and insures its discharge. While the above described operations have been taking place, however, other fruit has been fed to the empty tube 10 under the notch 1a at each step by step movement of the casting 9 and has been similarly treated.

It will now be noted, that the machine may be used for trimming the end or ends of fruit automatically in a rapid manner, and that the fruit may if desired be also cored thereby. While primarily intended for treating fruit which has been sized, the machine can be easily adapted for treating whole fruit. It is obvious that it may also be employed for trimming the end or ends of fruit which has previously been both sized and cored.

I claim:

1. A machine for treating fruit, comprising a plurality of fruit receiving tubes, means for moving said tubes to successive positions, power actuated means adapted to act directly on the fruit to move the same longitudinally in said tubes, means for trimming the ends of the fruit in certain of said positions, and means for discharging the fruit from the tubes.

2. A machine for treating fruit, comprising a plurality of fruit receiving tubes through which the fruit is passed, means for moving said tubes to successive positions, power actuated means adapted to act directly on the fruit to move the same longitudinally in said tubes, means for trimming and for removing the ends of the fruit when in two of said positions, and means for discharging the fruit from the tubes after the ends have been trimmed.

3. A machine for treating fruit, comprising a plurality of tubes adapted to receive fruit, means for moving said tubes together to successive positions, means for trimming off both of the ends and for coring the fruit, and means for discharging the fruit thus treated, these operations being effected in successive positions of said tubes.

4. In a machine for treating fruit, a fruit receiving tube through which the fruit is longitudinally movable, means to intermittently move the tube to a plurality of positions, means to hold the fruit in the tube with a portion thereof projecting out of the tube, means operative while the tube is at rest for trimming the end of fruit so projecting out of the tube, and means to discharge the fruit so treated.

5. In a machine for treating fruit, a fruit receiving tube through which the fruit is longitudinally movable, means to move the tube to a plurality of positions, power actuated means adapted to act directly on the fruit to move the same longitudinally within the tube until a portion of the fruit projects out of the tube, and means to treat the fruit while so projecting out of said tube.

6. In a machine for treating fruit, a tube, means for moving the tube into a plurality of positions, power actuated means adapted to act directly on the fruit to move the same longitudinally within the tube when in one of said positions, and a stop-plate spaced from said tube for limiting such longitudinal movement of the fruit, and means adapted to operate on the fruit when in engagement with said stop-plate.

7. In a machine for treating fruit, a tube, means for moving the tube into a plurality of positions, power actuated means for moving fruit longitudinally within the tube in one of said positions, an abutment limiting such longitudinal movement, and means for yieldingly holding the fruit against this abutment while being treated.

8. In a machine for treating fruit, a fruit receiving tube in which the fruit is longitudinally movable, means for moving the tube into a plurality of positions, a stop for limiting the longitudinal movement of the fruit, power actuated means adapted to act directly on the fruit to move the same longitudinally within the tube into engagement with said stop when the tube is in one of said positions, and means for severing the end of the fruit.

9. In a machine for treating fruit, a fruit receiving tube in which the fruit is longitudinally movable, means for moving the tube into a plurality of positions, a stop for limiting the longitudinal movement of the fruit, positive means adapted to act directly on the fruit to move the same longitudinally within the tube into engagement with said stop when the tube is in one of said positions, means for severing the end of the fruit, and positive means for removing the end thus severed.

10. In a machine for treating fruit, a tube, means for moving the tube into a plurality of positions, means for moving fruit longitudinally within the tube when in one of said positions, an abutment limiting such longitudinal movement, means for yieldingly holding the fruit against the abutment while being treated, and means for withdrawing said holding means when the fruit has been treated.

11. In a machine for treating fruit, a carrier adapted to move the fruit to a plurality of positions, means for trimming both ends of the fruit in successive positions of the carrier, and means for coring said fruit in another position of the carrier.

12. In a machine for treating fruit, a rotatable carrier adapted to move the fruit to a plurality of positions, means for severing both ends of the fruit in successive positions of the carrier, and means for coring the fruit in another position of the carrier.

13. In a machine for treating fruit, a carrier provided with a vertically disposed fruit receiving tube, means to move the tube to a plurality of positions, a stop-plate below and spaced from said tube and adapted to support the fruit in the tube, a second stop-plate above and spaced from said tube, and means operative in one position of the tube to move the fruit upwardly therein and into engagement with said second stop-plate.

14. In a machine for treating fruit, a rotatable carrier comprising a plurality of fruit receiving tubes, means to rotate the carrier intermittently, stop-plates spaced above and below said tube, means to trim one end of the fruit when the same projects out of the tube and abuts said lower stop-plate, means operative while the carrier is at rest to move the fruit into engagement with the upper stop-plate, and means to trim the other end of the fruit when the same projects out of the tubes and abuts the upper stop-plate.

15. In a machine for treating fruit, a rotatable carrier comprising a plurality of fruit receiving tubes, stop-plates spaced above and below said tube, means to trim one end of the fruit when the same projects out of the tube and abuts said lower stop-plate, means adapted to act directly on the fruit to move the same longitudinally in said tube into engagement with said upper stop-plate, and means for then trimming the other end of the fruit.

16. In a machine for treating fruit, a plurality of fruit receiving tubes, stop-plates spaced above and below the same, means to trim one end of the fruit projecting from said tube and abutting the lower stop-plate, means adapted to act directly on the fruit to move the same longitudinally into engagement with the upper stop-plate, and means to trim the other end of the fruit when in the latter position.

17. In a machine for treating fruit, a plurality of fruit receiving tubes, stop-plates spaced above and below the same, means to trim one end of the fruit projecting from said tube and abutting the lower stop-plate, means to move the fruit longitudinally into engagement with the upper stop-plate, means to trim the other end of the fruit when in the latter position, and means to core the fruit so trimmed.

In testimony whereof I affix my signature, in presence of two witnesses.

HENRY GABRIEL GINACA.

Witnesses:
ARTHUR F. EWART,
ROBT. J. PRATT.